US011753979B2

(12) United States Patent
Chiruta et al.

(10) Patent No.: US 11,753,979 B2
(45) Date of Patent: Sep. 12, 2023

(54) SYSTEMS AND METHODS FOR GENERATING AMMONIA

(71) Applicant: Cummins Emission Solutions Inc., Columbus, IN (US)

(72) Inventors: Mihai Chiruta, Madison, WI (US); Samuel Johnson, East Wenatchee, WA (US); Tiffany D. Morgan, Columbus, IN (US); George Eugene Mavroudis, Oregon, WI (US); Luis N. Moreno, Louisville, KY (US)

(73) Assignee: Cummins Emission Solutions Inc., Columbus, IN (US)

( * ) Notice: Subject to any disclaimer, the term of this patent is extended or adjusted under 35 U.S.C. 154(b) by 48 days.

(21) Appl. No.: 17/636,928

(22) PCT Filed: Aug. 22, 2019

(86) PCT No.: PCT/US2019/047722
§ 371 (c)(1),
(2) Date: Feb. 21, 2022

(87) PCT Pub. No.: WO2021/034330
PCT Pub. Date: Feb. 25, 2021

(65) Prior Publication Data
US 2022/0356830 A1 Nov. 10, 2022

(51) Int. Cl.
*F01N 3/28* (2006.01)
*F01N 3/20* (2006.01)
*F01N 3/34* (2006.01)

(52) U.S. Cl.
CPC ............. *F01N 3/28* (2013.01); *F01N 3/2073* (2013.01); *F01N 3/34* (2013.01)

(58) Field of Classification Search
CPC .................... F01N 2240/16; F01N 2610/10
See application file for complete search history.

(56) References Cited

U.S. PATENT DOCUMENTS

| 7,712,304 B2 | 5/2010 | Mayer et al. |
| 8,033,714 B2 | 10/2011 | Nishioka et al. |
(Continued)

FOREIGN PATENT DOCUMENTS

| EP | 0 487 886 A1 | 6/1992 |
| EP | 0 555 746 A1 | 8/1993 |
(Continued)

OTHER PUBLICATIONS

International Search Report and Written Opinion issued for PCT Application No. PCT/US2019/047722 dated Nov. 15, 2019, 18 pages.
(Continued)

*Primary Examiner* — Anthony Ayala Delgado
(74) *Attorney, Agent, or Firm* — Foley & Lardner LLP

(57) ABSTRACT

An ammonia generating apparatus comprises a housing comprising a first end wall on which a reductant injector configured to insert a reductant into the housing is mountable. A heating coil assembly is disposed within the housing. A first end of the heating coil assembly is located proximate to a location of the first end wall where a reductant injector tip of the reductant injector is located when the reductant injector is mounted on the first end wall. The heating coil assembly is configured to generate heat sufficient to thermolyze the reductant to generate ammonia and reaction byproducts, in response to an electric current being passed therethrough. A hydrolysis catalyst can be disposed downstream of the heating coil assembly for catalyzing hydrolysis of the reaction byproducts into ammonia.

18 Claims, 8 Drawing Sheets

(56) References Cited

U.S. PATENT DOCUMENTS

| | | |
|---|---|---|
| 8,080,209 B2 | 12/2011 | Shirono et al. |
| 8,176,731 B2 | 5/2012 | Doring et al. |
| 9,132,385 B2 | 9/2015 | Kwan |
| 10,024,213 B2 | 7/2018 | Mitchell et al. |
| 2004/0040288 A1 | 3/2004 | Jacob et al. |
| 2007/0036694 A1 | 2/2007 | Nishioka et al. |
| 2007/0186542 A1 | 8/2007 | Hirata |
| 2009/0205325 A1 | 8/2009 | Kistner et al. |
| 2012/0216510 A1 | 8/2012 | Xu et al. |
| 2015/0321145 A1 | 11/2015 | Bartley |
| 2016/0281566 A1 | 9/2016 | Deshpande |

FOREIGN PATENT DOCUMENTS

| | | |
|---|---|---|
| EP | 1 052 009 B1 | 4/2005 |
| WO | WO-2017/198601 A1 | 11/2017 |
| WO | WO-2018/185655 A1 | 10/2018 |
| WO | WO-2018/185663 A1 | 10/2018 |

OTHER PUBLICATIONS

Nishioka, et al., "A Study of a New Aftertreatment System (2): Control of Urea Solution Spray for Urea-SCR," SAE Technical Paper 2006-01-0644, 10 pages (2006).

SYSTEMS AND METHODS FOR GENERATING AMMONIA

CROSS-REFERENCE TO RELATED APPLICATION

This application is a National Stage of PCT Application No. PCT/US2019/047722, filed Aug. 22, 2019 and the contents of which are incorporated by herein reference in their entirety.

TECHNICAL FIELD

The present disclosure relates generally to systems and methods for generating ammonia that can be used in aftertreatment systems.

BACKGROUND

Exhaust aftertreatment systems are used to receive and treat exhaust gas generated by internal combustion engines. Generally, exhaust gas aftertreatment systems include any of several different components to reduce the levels of harmful exhaust emissions present in the exhaust gas. For example, certain exhaust gas aftertreatment systems for diesel-powered internal combustion engines include a selective catalytic reduction (SCR) system including a catalyst formulated to convert NOx (NO and $NO_2$ in some fraction) into harmless nitrogen gas ($N_2$) and water vapor ($H_2O$) in the presence of ammonia ($NH_3$). Generally in such aftertreatment systems, an exhaust reductant, (e.g., a diesel exhaust fluid such as urea) is injected into the SCR system to provide a source of ammonia, and mixed with the exhaust gas to partially reduce the NOx gases. The reduction byproducts of the exhaust gas are then fluidly communicated to the catalyst included in the SCR system to decompose substantially all of the NOx gases into relatively harmless byproducts which are expelled out of the aftertreatment system.

Generally, the reductant is inserted in liquid phase into the exhaust gas where it vaporizes and generates ammonia. Inefficient mixing of the liquid reductant with exhaust gas, or impinging of the reductant on sidewalls of an exhaust conduit of the aftertreatment system may result in formation of reductant deposits (e.g., due to crystallization of the reductant) in the exhaust tube and components of the aftertreatment system. Reductant deposits reduce the efficiency of the aftertreatment system and may cause clogging of the exhaust conduit demanding frequent cleaning of the exhaust tube. The reductant deposits may also accumulate in downstream components, for example, the SCR system and may reduce a catalytic efficiency thereof. Reductant deposits therefore may require frequent maintenance to be performed on the aftertreatment system, increasing maintenance costs.

SUMMARY

Embodiments described herein relate generally to systems and methods for generating ammonia for use in aftertreatment systems, and in particular, to an ammonia generating apparatus that includes one or more heating coils disposed within a housing to which a reductant injector is coupled. The one or more heating coils generate heat sufficient to thermolyze the reductant and produce ammonia which is inserted into the aftertreatment system. A hydrolysis catalyst may be disposed downstream of the one or more coils and is configured to catalyze conversion of reaction byproducts of the thermolysis reaction into ammonia. In other embodiments, thermolysis is performed by increasing a temperature of a portion of the exhaust gas in which the reductant is inserted by inserting hydrocarbons in the exhaust gas.

In some embodiments, an ammonia generating apparatus comprises: a housing comprising a first end wall on which a reductant injector configured to insert a reductant into the housing is mountable; and a heating coil assembly disposed within the housing, wherein a first end of the heating coil assembly is located proximate to a location of the first end wall where a reductant injector tip of the reductant injector is located when the reductant injector is mounted on the first end wall, and wherein the heating coil assembly is configured to generate heat sufficient to thermolyze the reductant to generate ammonia and reaction byproducts, in response to an electric current being passed therethrough.

In some embodiments, a reductant insertion system for inserting a reductant into an aftertreatment system, comprises: a reductant insertion assembly; a reductant injector disposed downstream of the reductant insertion assembly; and an ammonia generating apparatus configured to be fluidly coupled to an exhaust conduit of an aftertreatment system, the ammonia generating apparatus comprising: a housing comprising a first end wall on which the reductant injector is mounted, wherein the reductant injector is configured to insert a reductant into the housing, and a heating coil assembly disposed within the housing, a first end of the heating coil assembly located proximate to a reductant injector tip of the reductant injector, the heating coil assembly configured to generate heat sufficient to thermolyze the reductant to generate ammonia and reaction byproducts, in response to an electric current being passed therethrough.

In some embodiments, an aftertreatment system for treating exhaust gas produced by an engine, comprises: an exhaust conduit configured to receive the exhaust gas; a SCR system disposed in the exhaust conduit; a bypass conduit fluidly coupled to the exhaust conduit, the bypass conduit configured to receive a portion of the exhaust gas flowing through the exhaust conduit from an upstream location of the exhaust conduit and return the portion of the exhaust gas to the exhaust conduit at a downstream location of the exhaust conduit; a first oxidation catalyst disposed in the bypass conduit; a hydrolysis catalyst disposed in the bypass conduit downstream of the first oxidation catalyst; a reductant injector coupled to the bypass conduit at a location between the first oxidation catalyst and the hydrolysis catalyst and configured to insert a reductant into the exhaust conduit between the first oxidation catalyst and the hydrolysis catalyst; and a hydrocarbon insertion assembly configured to selectively insert hydrocarbons into the first oxidation catalyst causing the hydrocarbons to combust so as to increase a temperature of the exhaust gas to a first temperature sufficient to thermolyze the reductant and generate ammonia and reaction byproducts, wherein the hydrolysis catalyst is formulated to catalyze hydrolysis of the reaction byproducts into ammonia.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following descrip

Figure 1:
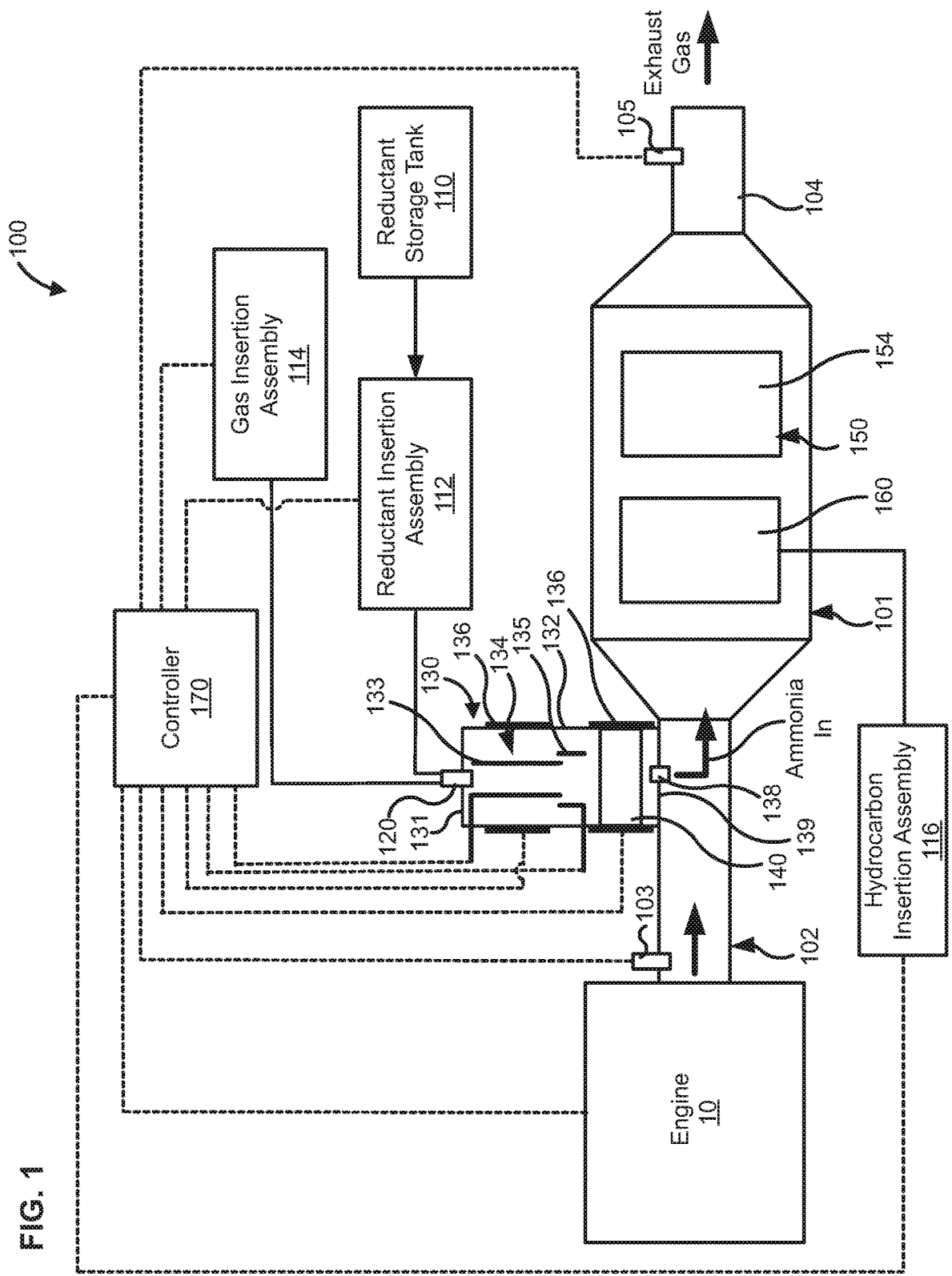
- FIG. 1 is a schematic block diagram of an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for generating ammonia for use in aftertreatment systems, and in particular, to an ammonia generating apparatus that includes one or more heating coils disposed within a housing to which a reductant injector is coupled. The one or more heating coils generate heat sufficient to thermolyze the reductant and produce ammonia which is inserted into the aftertreatment system. A hydrolysis catalyst may be disposed downstream of the one or more coils and is configured to catalyze conversion of reaction byproducts of the thermolysis reaction into ammonia. In other embodiments, thermolysis is performed by increasing a temperature of a portion of the exhaust gas in which the reductant is inserted by inserting hydrocarbons in the exhaust gas.

Ammonia generators for aftertreatment systems are intended to deliver gaseous ammonia to the aftertreatment system. The ammonia is used as a reductant for NOx gases typically present in exhaust gas (e.g., diesel exhaust gas). In conventional aftertreatment systems, ammonia is obtained from a precursors such as a urea/water solution. There are engine operating conditions (cold temperature and/or high NOx output) when the reductant converts into solid urea deposits. These deposits impede the normal functioning of the aftertreatment system, for example, an SCR system included in the aftertreatment system. One way to avoid the formation of these deposits is to reduce or eliminate the amount of reductant injected. In typical application of reductant injection into the aftertreatment system, heat from the exhaust gas is utilized to decompose the reductant into ammonia. If the heat in the exhaust gas is insufficient, (e.g., below 135 to 150 degrees Celsius at which the reductant does not decompose into ammonia) such as at engine start, ammonia production rate is poor. This can lead to lower catalytic conversion efficiency of the SCR system, as well as increase in reductant deposit formation.

Various embodiments of the ammonia generating apparatus described herein may provide one or more benefits including, for example: (1) allowing decomposition of liquid reductant into ammonia independent of exhaust gas conditions, which can then be inserted into the aftertreatment system; (2) facilitating high catalytic conversion of the SCR system at low ambient temperature conditions because the generated ammonia remains in gaseous phase at near atmospheric pressure up to −33 degrees Celsius, and therefore is available for use by the SCR system at the low ambient temperature conditions; (3) reducing reductant deposits; and (4) allowing easy integration with existing aftertreatment systems.

FIG. 1 is a schematic illustration of an aftertreatment system 100, according to an embodiment. The aftertreatment system 100 is configured to receive an exhaust gas (e.g., a diesel exhaust gas) from an engine 10 and decompose constituents of the exhaust gas such as, for example, NOx gases, CO, etc. The aftertreatment system 100 includes a reductant storage tank 110, a reductant insertion assembly 112, a reductant injector 120, an ammonia generating apparatus 130, a SCR system 150, a controller 170, and optionally, a gas insertion assembly 114, an oxidation catalyst 160, and a hydrocarbon insertion assembly 116.

The engine 10 may include an internal combustion engine, for example a diesel engine, a gasoline engine, a natural gas engine, a biodiesel engine, a dual fuel engine, an alcohol engine, an E85 or any other suitable internal combustion engine.

The reductant storage tank 110 contains a reductant formulated to facilitate reduction of the constituents of the exhaust gas (e.g., NOx gases) by a catalyst 154 included in the SCR system 150. In embodiments in which the exhaust gas is a diesel exhaust gas, the reductant may include a diesel exhaust fluid (DEF) which provides a source of ammonia. Suitable DEFs can include urea, aqueous solution of urea or any other DEF (e.g., the DEF available under the tradename ADBLUE®). In particular embodiments, the reductant includes an aqueous urea solution containing 32.5% urea and 67.5% de-ionized water. In other embodiments, the reductant includes aqueous urea solution containing 40% urea and 60% de-ionized water.

The SCR system 150 is configured to receive and treat the exhaust gas (e.g., a diesel exhaust gas) flowing through the SCR system 150 in the presence of ammonia. The aftertreatment system 100 includes an exhaust conduit 101 defining an exhaust flow path for communicating the exhaust gas. The SCR system 150 is positioned within the exhaust conduit 101. In some embodiments, the exhaust conduit 101 includes an inlet tube 102 positioned upstream of the SCR system 150 and configured to receive exhaust gas from the engine 10 and communicate the exhaust gas to the SCR system 150. The exhaust conduit 101 may also include an outlet tube 104 for expelling treated exhaust gas into the environment.

A first sensor 103 may be positioned in the inlet tube 102. The first sensor 103 may include, for example a NOx sensor (e.g., a physical or virtual NOx sensor), an oxygen sensor, a particulate matter sensor, a carbon monoxide sensor, a temperature sensor, a pressure sensor, any other sensor or a combination thereof configured to measure one or more operational parameters of the exhaust gas. Such operating parameters may include, for example, an amount of NOx gases in the exhaust gas, a temperature of the exhaust gas, a flow rate and/or pressure of the exhaust gas.

A second sensor 105 may be positioned in the outlet tube 104. The second sensor 105 may include a second NOx sensor configured to determine an amount of NOx gases expelled into the environment after passing through the SCR system 150. In other embodiments, the second sensor 105 may comprise a particulate matter sensor configured to determine an amount of particulate matter (e.g., soot or ash) included in the exhaust gas. In still other embodiments, the second sensor 105 may comprise an ammonia sensor configured to measure an amount of ammonia in the exhaust gas flowing out of the SCR system 150, i.e., determine the ammonia slip. The ammonia slip may be used as a measure of catalytic efficiency of the SCR system 150, for adjusting an amount of reductant to be inserted into the SCR system 150, and/or for adjusting a temperature of the SCR system 150 so as to allow the SCR system 150 to effectively use the ammonia for catalytic decomposition of the NOx gases included in the exhaust gas flowing therethrough. In some embodiments, an ammonia oxide (AMOx) catalyst may be positioned downstream of the SCR system 150, for example, in the outlet tube 104 so as to decompose any unreacted ammonia in the exhaust gas downstream of the SCR system 150.

The SCR system 150 includes at least one catalyst 154 positioned within an internal volume defined by the exhaust conduit 101. In some embodiments, the SCR system 150 may comprise a selective catalytic reduction filter (SCRF), or any other aftertreatment component configured to decompose constituents of the exhaust gas (e.g., NOx gases such as such nitrous oxide, nitric oxide, nitrogen dioxide, etc.), flowing through the exhaust conduit 101 in the presence of a reductant, as described herein. Any suitable catalyst 154 can be used such as, for example, platinum, palladium, rhodium, cerium, iron, manganese, copper, vanadium based catalysts (including combinations thereof).

The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials can include, for example, aluminum oxide, titanium dioxide, silicon dioxide, any other suitable washcoat material, or a combination thereof. The exhaust gas can flow over and about the catalyst 154 such that NOx gases included in the exhaust gas are further reduced to yield an exhaust gas which is substantially free of carbon monoxide and NOx gases.

In various embodiments, the aftertreatment system 100 may also include other aftertreatment components such as, for example, an oxidation catalyst (e.g., a diesel oxidation catalyst), one or more particulate matter filters, ammonia oxidation catalysts, mixers, baffle plates, or any other suitable aftertreatment component. Such aftertreatment components may be positioned upstream or downstream of the SCR system 150 within the exhaust conduit 101.

The reductant insertion assembly 112 is fluidly coupled to the reductant storage tank 110 and is configured to provide the reductant to the reductant injector 120 positioned upstream of the SCR system 150. The reductant insertion assembly 112 may comprise various structures to facilitate receipt of the reductant from the reductant storage tank 110 and delivery to the reductant injector 120 for insertion into the ammonia generating apparatus 130, as described in detail herein.

In various embodiments, the reductant insertion assembly 112 may include one or more pumps (e.g., a diaphragm pump, a positive displacement pump, a centrifugal pump, a vacuum pump, etc.) for delivering the reductant to the reductant injector 120 at an operating pressure and/or flow rate. The reductant insertion assembly 112 may also include filters and/or screens (e.g., to prevent solid particles of the reductant or contaminants from flowing into the one or pumps) and/or valves (e.g., check valves) configured to draw reductant from the reductant storage tank 110. Screens, check valves, pulsation dampers, or other structures may also be positioned downstream of the one or more pumps of the reductant insertion assembly 112 and configured to remove contaminants and/or facilitate delivery of the reductant to the reductant injector 120.

In various embodiments, the reductant insertion assembly 112 may also include a bypass line structured to provide a return path of the reductant from the one or more pumps to the reductant storage tank 110. A valve (e.g., an orifice valve) may be provided in the bypass line to allow selective returning of the reductant to the reductant storage tank 110 (e.g., when the engine 10 is turned OFF or during a purge operation of the reductant insertion assembly 112).

The reductant injector 120 is mounted on the ammonia generating apparatus 130 downstream of the reductant insertion assembly 112. The reductant injector 120 may include one or more nozzles, valves, actuators, or any other suitable components for inserting a stream of the reductant into the ammonia generating apparatus 130. In some embodiments, the reductant injector 120 may be configured for air assisted delivery of the reductant into the ammonia generating apparatus 130. In such embodiments, the aftertreatment system 100 also includes the gas insertion assembly 114 that is configured to provide air or any other gas (e.g., nitrogen or a portion of the exhaust gas) to the reductant injector 120 for gas assisted delivery of the reductant into the ammonia generating apparatus 130.

The gas insertion assembly 114 may include, for example, a compressed gas cylinder, an exhaust gas recirculation system to configured to recirculate a portion of the exhaust gas to the reductant injector 120, valves, actuator, or any other suitable components configured to selectively provide air, exhaust gas or any other gas to the reductant injector 120. In such embodiments, the reductant injector 120 may also include a blending chamber structured to receive pressurized reductant from the reductant insertion assembly 112 at a controllable rate (e.g., via a metering valve included in the reductant insertion assembly 112). The blending chamber may also be structured to receive gas (e.g., compressed air or portion of the exhaust gas), or any other inert gas (e.g., nitrogen), from the gas insertion assembly 114 so as to deliver a combined flow of the air and the reductant into the ammonia generating apparatus 130.

In some embodiments, the aftertreatment system 100 may also include the oxidation catalyst 160 (e.g., a diesel oxidation catalyst) configured to decompose hydrocarbons present in the exhaust gas. In some embodiments, the aftertreatment system 100 may also include a hydrocarbon insertion assembly 116 configured to selectively insert hydrocarbons (e.g., diesel) into the exhaust gas. The hydrocarbons combust and increase the temperature of the exhaust gas to a temperature (e.g., greater than 500 degrees Celsius) sufficient to regenerate the SCR system 150. In some embodiments, hydrocarbon combustion can also be used to increase the temperature of the exhaust gas to a temperature (e.g. greater than around 190 degrees Celsius) to increase the conversion efficiency of the SCR system 150, and the hydrolysis capability of the hydrolysis catalyst 140.

The ammonia generating apparatus 130 is mounted on the inlet tube 102 but in other embodiments, may be mounted at any other suitable location of the exhaust conduit 101 that is upstream of the SCR system 150, or over the SCR system 150 such that the apparatus 130 is fluidly coupled to the exhaust conduit 101. The ammonia generating apparatus 130 is configured to generate ammonia gas from liquid phase reductant inserted therein by the reductant injector 120.

Expanding further, the ammonia generating apparatus 130 includes a housing 132 defining an internal volume. In some embodiments, the housing 132 may have a cylindrical cross-sectional shape. In other embodiments, the housing 132 may have a rectangular, square, oval, elliptical, polygonal, asymmetric or any other suitable cross-sectional shape, or a combination thereof. The housing 132 may be formed from any suitable corrosion resistance and heat resistant material, for example, stainless steel, aluminum, alloys, polymers, etc.

The housing 132 includes a first end wall 131 on which the reductant injector 120 is mounted. In some embodiments, the first end wall 131 may include an end cap coupled to the housing 132. The first end wall 131 may define an opening for receiving the reductant injector 120. Coupling features may be defined in the opening for securing the reductant injector 120 in the first end wall 131. In some embodiments, the coupling features may include threads configured to mate with mating threads defined on an outer surface of the reductant injector 120. In other embodiments, a reductant injector mount (not shown) may be disposed in the first end wall of the housing 132. In such embodiments, the reductant injector 120 is mounted on the reductant injector mount.

A second end wall 139 of the housing 132 that may be located axially opposite the first end wall 131 is mounted on the inlet tube 102, for example, bolted, riveted, screwed, or welded thereon. An outlet 138 is defined in the second end wall 139 and is in fluid communication with the exhaust flow path defined by the inlet tube 102 so as to insert ammonia into the exhaust gas. In other embodiments, the housing 132 may be disposed at a location that is remote from the outlet tube 104. In such embodiments, an outlet tube (not shown) may be used to fluidly couple the outlet 138 to the inlet tube 102.

Figure 3:
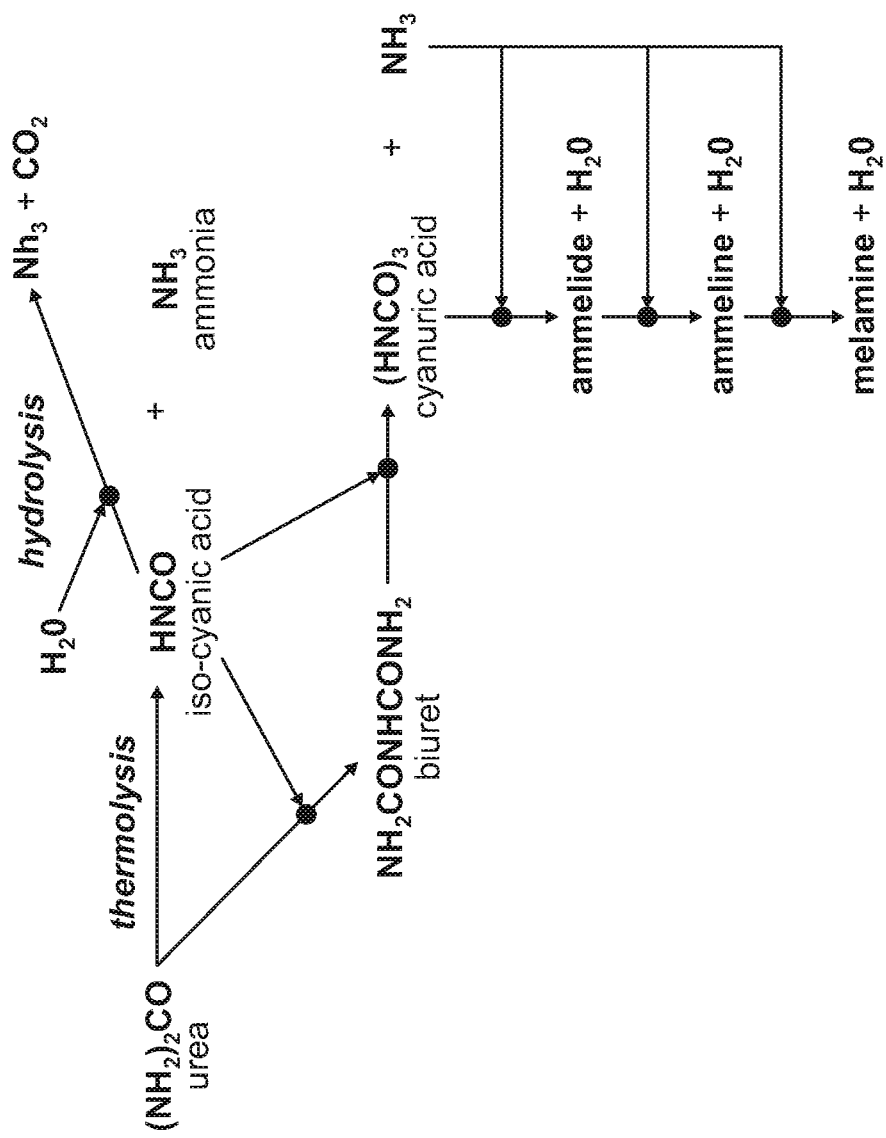
FIG. 3 illustrates a reaction pathway for generating ammonia from urea via thermolysis, and converting reaction byproducts of the thermolysis reaction into ammonia via hydrolysis.
Figure 4:
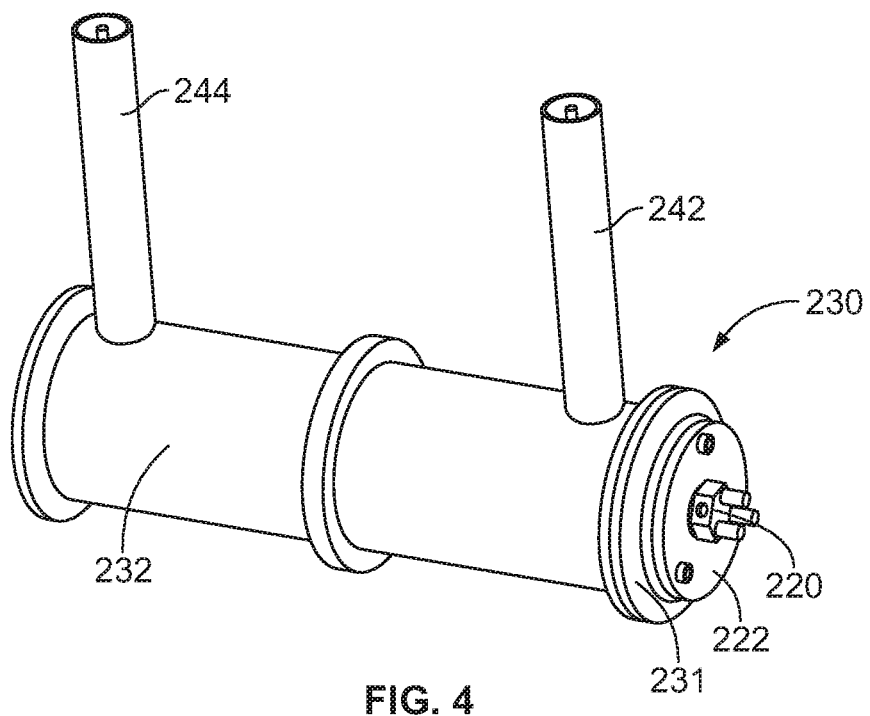
FIG. 4 is a top, front, side perspective view of an ammonia generating apparatus, according to an embodiment.
Figure 5:
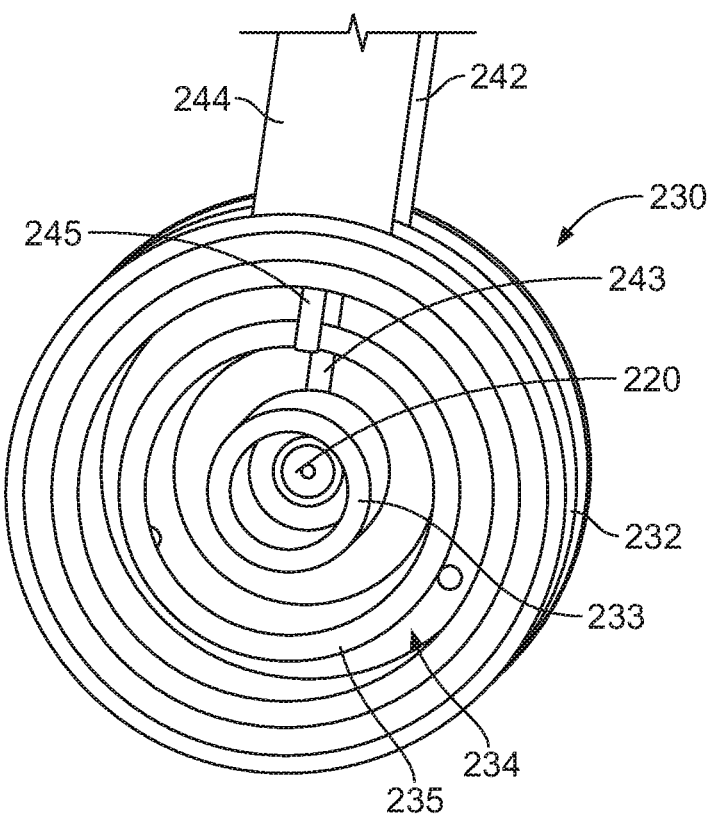
FIG. 5 is an end view of the ammonia generating apparatus of FIG. 4.

The ammonia generating apparatus 130 also includes a heating coil assembly 134 disposed within the internal volume defined by the housing 132. A first end of the heating coil assembly 134 is located proximate to a location of the first end wall 131 where a reductant injector tip of the reductant injector 120 is located when the reductant injector 120 is mounted on the first end wall 131. The heating coil assembly 134 is configured to generate heat sufficient to thermolyze the reductant inserted by the reductant into the housing 132 so as to generate ammonia and reaction byproducts, in response to an electric current being passed therethrough. For example, FIG. 3 illustrates a possible thermolysis reaction pathway of urea that generates ammonia and iso-cyanic acid as a byproduct.

In some embodiments, a hydrolysis catalyst 140 is disposed downstream of the heating coil assembly 134. The hydrolysis catalyst 140 is configured to catalyze hydrolysis of the reaction byproducts (e.g., iso-cyanic acid) to generate ammonia, for example, as shown in the reaction pathway of FIG. 3. Thus, a significant portion of the liquid urea inserted into the ammonia generating apparatus 130 is converted into ammonia gas. The ammonia gas is inserted through the outlet 138 into the exhaust gas flowing through the exhaust conduit 101. The hydrolysis catalyst 140 may include, for example, $ZrO_2$, $Al_2O_3$, $TiO_2$, H-ZSM-5, $SiO_2$ or any other suitable catalyst formulated to catalyze the hydrolysis of thermolyzed reaction byproducts of a reductant such as urea, into ammonia (e.g., in the presence of water that is inherently present in the exhaust gas, or inserted into the ammonia generating apparatus 130).

In some embodiments, the heating coil assembly 134 includes a single heating coil. In particular embodiments as shown in FIG. 1, the heating coil assembly 134 includes a first heating coil 133 located proximate to the reductant injector 120. The first heating coil 133 has a first cross-sectional width. A second heating coil 135 is located distant from the reductant injector 120 (e.g., axially spaced apart from the reductant injector 120 by the first heating coil 133) and axially aligned with the first heating coil 133. The second heating coil 135 has a second cross-sectional width that is larger than the first cross-sectional width of the first heating coil. Generally, the reductant is ejected from a reductant injector tip of the reductant injector 120 as a spray cone that expands away from the reductant injector tip. The smaller diameter first heating coil 133 may thermolyze reductant proximate to the reductant injector tip where the spray cone diameter is small. As the spray cone expands, a small portion of the liquid reductant spray may escape downstream of the first heating coil 133 to a location of the larger second heating coil 135 thermolyzed by the heat generated by the larger second heating coil 135.

The ammonia generating apparatus 130 also includes a heater 136 disposed on an outer surface of the housing 132 and configured to selectively heat the housing 132 and thereby, the internal volume of the housing 132. In some embodiments, the heater 136 may include one or a pair of clamp heaters disposed on the outer surface of the housing 132. In particular embodiments, the heater 136 may include a heater that is used to heat the SCR system 150 during cold cycles. For example, one or more loops of the heater used to heat the SCR system 150 may be looped around the housing 132 to form the heater 136.

FIGS. 3-7 show various views of an ammonia generating apparatus 230, according to another embodiment. The ammonia generating apparatus 230 includes a housing 232 defining an internal volume. The housing 232 defines a cylindrical cross-section. A reductant injector 220 is disposed on a first end wall 231 of the housing 232. A heating coil assembly 234 is disposed within the internal volume defined by the housing 232. The heating coil assembly 234 includes a first heating coil 233 located proximate to a location of the first end wall 231 where a reductant injector tip 221 of the reductant injector 220 is located. The first heating coil has a first cross-sectional width C1 (e.g., diameter). A second heating coil 235 is disposed distant from the reductant injector 220 (e.g., axially spaced apart from the reductant injector 120 by the first heating coil 133) and is axially aligned with the first heating coil 233. The second heating coil 235 has a second cross-sectional width C2 (e.g., diameter) that is larger than the first cross-sectional width C1.

The housing 232 may include a first electrical lead conduit 242 and a second electrical lead conduit 244, each extending perpendicular to an outer surface of the housing 232. A first electrical lead 243 is disposed through the first electrical lead conduit 242 and is communicatively coupled to the first heating coil 233 for providing electrical power thereto. Similarly, a second electrical lead 245 is disposed through the second electrical lead conduit 244 and is communicatively coupled to the second heating coil 235 for providing electrical power thereto. While not shown, in some embodiments, the housing 232 may include a catalyst housing portion located downstream of the heating coil assembly 134 within which a hydrolysis catalyst (e.g., the hydrolysis catalyst 140) is disposed, as previously described herein.

Figure 6:
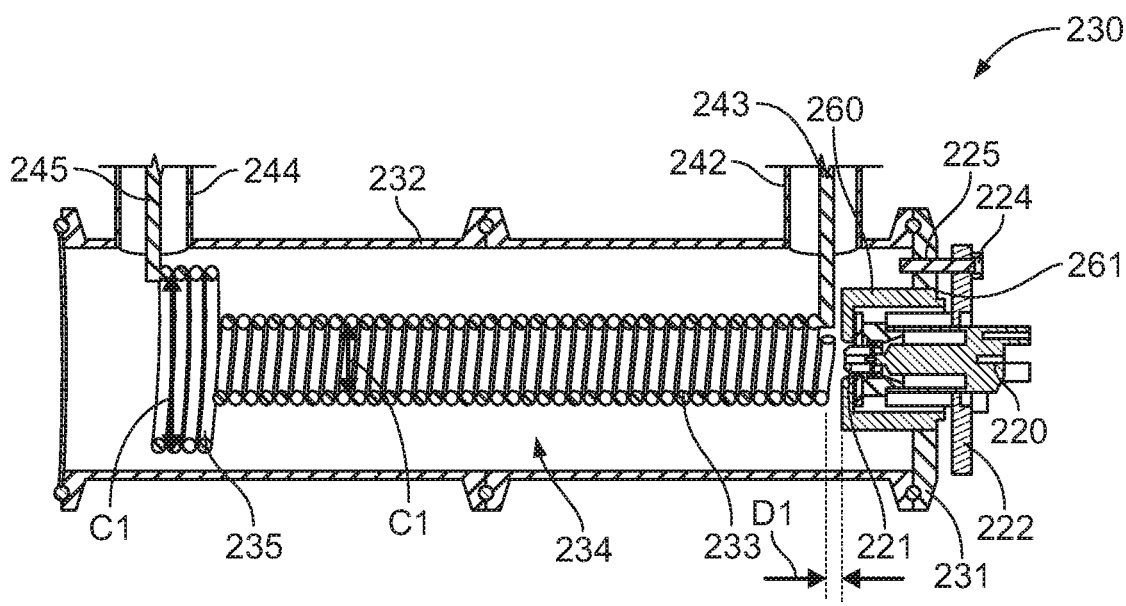
FIG. 6 is a side cross-section view of the ammonia generating apparatus of FIG. 4 in a first configuration.

As shown in FIG. 6, the reductant injector 220 is mounted in a reductant injector mount 260 that is inserted through an opening 261 defined in the first end wall 231 (e.g., an end cap). In some embodiments, threads may be defined on an inner surface of the opening 261 that mate with corresponding mating threads defined on an outer surface of the reductant injector mount 260. In some embodiments, a mounting plate 222 may be coupled to a radially outer surface of the reductant injector 220 and extend radially outwards therefrom. A coupling member 224 (e.g., a lead screw) may extend through the mounting plate 222 into an aperture 225 defined in the first end wall 231. The aperture 225 is defined radially outwards of the opening 261. The reductant injector mount 260 is adjustably mounted in the opening 261 such that an axial distance of a reductant injector tip 221 of the first heating coil 233 may be adjusted.

For example, FIG. 6 shows the ammonia generating apparatus 230 in a first configuration in which the reductant injector mount 260 inserted through the opening 261, for example, threaded such that the reductant injector mount 260 is at a first location where the reductant injector tip 221 is spaced apart from the first heating coil 233 by a first distance D1. The coupling member 224 may be used to secure the reductant injector mount 260 at the first location.

Figure 7:
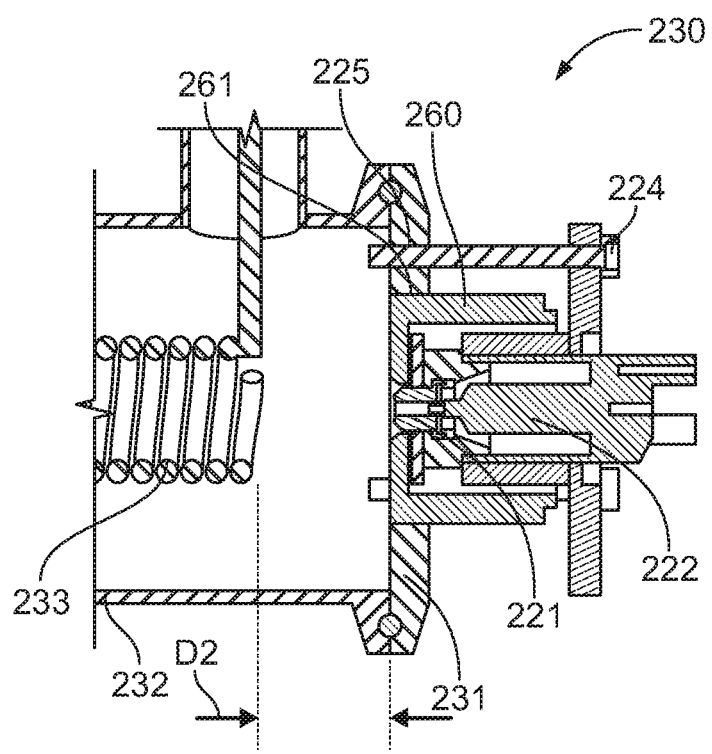
FIG. 7 is a side cross-section view of the ammonia generating apparatus of FIG. 4 in a second configuration.

FIG. 7 shows the ammonia generating apparatus 230 in a second configuration in which the reductant injector mount 260 is displaced (e.g., threaded out) of the opening 261 until the reductant injector mount 260 is located at a second location where the reductant injector tip 221 is spaced apart from the second heating coil 235 by a second distance D2 larger than the first distance D1. The reductant injector mount 260 may be secured at the second location by the coupling member 224, or by using a longer coupling member. Allowing the distance between the reductant injector tip 221 and the first heating coil 233 to be adjustable allows for adjusting a diameter of the reductant spray cone when it contacts first heating coil that can impact a thermolysis efficiency of the heating coil assembly 234, and also allows tailoring of the ammonia generating apparatus 230 or any other ammonia generating apparatus described herein to match various operating conditions, various reductant injector configurations, and various ammonia generating apparatus geometries.

Furthermore, the reductant injector 220 may be configured to provide droplet moment targeting (DMT) to control characteristics of the reductant droplet spray that is inserted into the ammonia generating apparatus 130 by the reductant injector 120. DMT in conjunction with adjustment of the distance of the reductant injector tip 221 from the first heating coil 233 may be used optimize characteristics of the reductant spray (e.g., based on the operating conditions of the exhaust gas) to maximize ammonia production and minimize reductant deposit generation.

Figure 8:
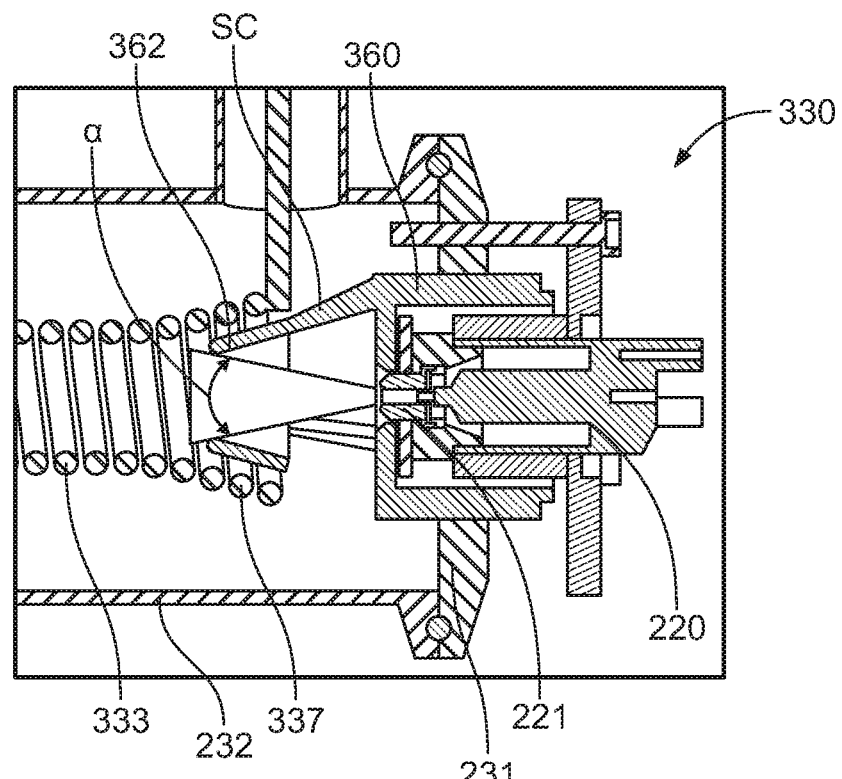
FIG. 8 is a side cross-section view of a portion of an ammonia generating apparatus, according to another embodiment.

FIG. 8 shows a portion of an ammonia generating apparatus 330, according to still another embodiment. The ammonia generating apparatus 330 is similar to the ammonia generating apparatus 230 and includes the housing 232 having the first end wall 231 on which the reductant injector 220 is mounted. However, different from the apparatus 230, the ammonia generating apparatus 330 includes a heating coil assembly having a first heating coil 333, a portion of which is shown in FIG. 8.

A first heating coil first end 337 of the first heating coil 333 that is located proximate to the reductant injector 220 is flared or otherwise tapered radially outwards towards the reductant injector 220, as shown in FIG. 8. Furthermore, the reductant injector 220 is mounted on a reductant injector mount 360 that includes a cone shaped baffle 362 extending from the reductant injector mount 360 towards the first heating coil 333. An end of the cone shaped baffle 362 distant from the reductant injector 220 may extend into the flared first heating coil first end 337. The cone shaped baffle 362 may be configured to confine the a spray cone SC of the reductant that has a spray cone angle α (e.g., in a range of 15 degrees to 35 degrees, inclusive), to be within the first heating coil 333 to facilitate thermolysis of the reductant into ammonia, as previously described herein. Thus, the tapered first heating coil first end 337 may improve flow of the reductant over the first heating coil 333 and/or the second heating coil 335, and improve ammonia generation efficiency, for example, due to improved heat transfer to the reductant via radiative and forced convection heat transfer.

Figure 9:
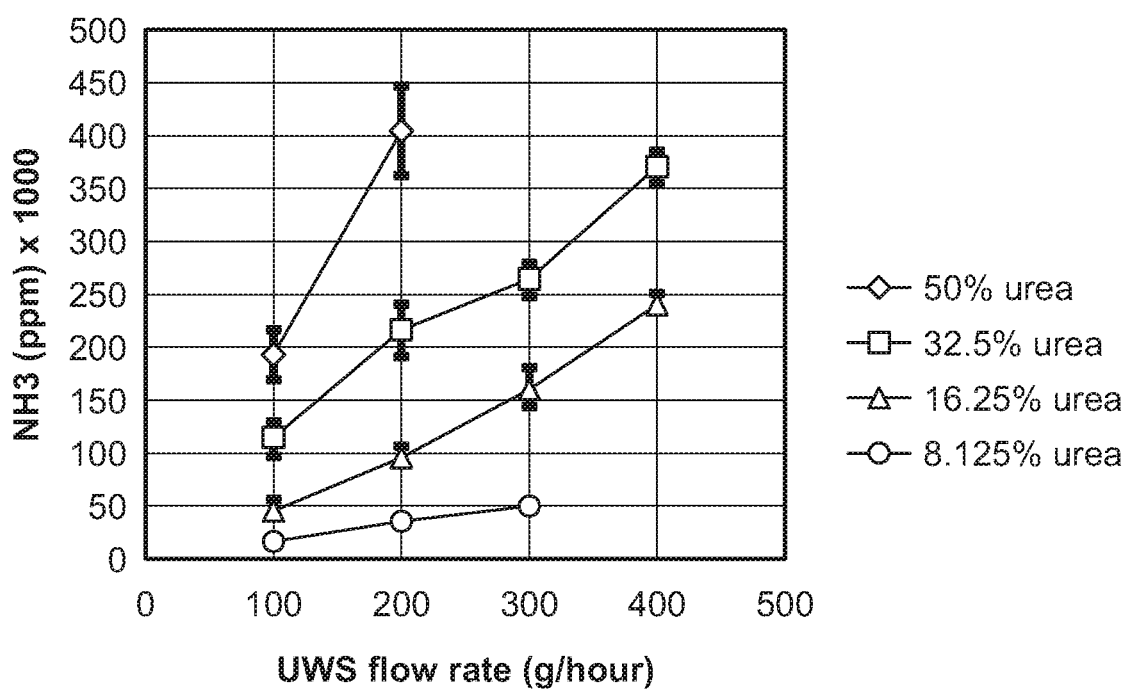
FIG. 9 is a graph showing plots of urea solution that were inserted into an ammonia generating apparatus at various insertion flow rates, and the corresponding amount of ammonia produced by the ammonia generating apparatus.
Figure 10:
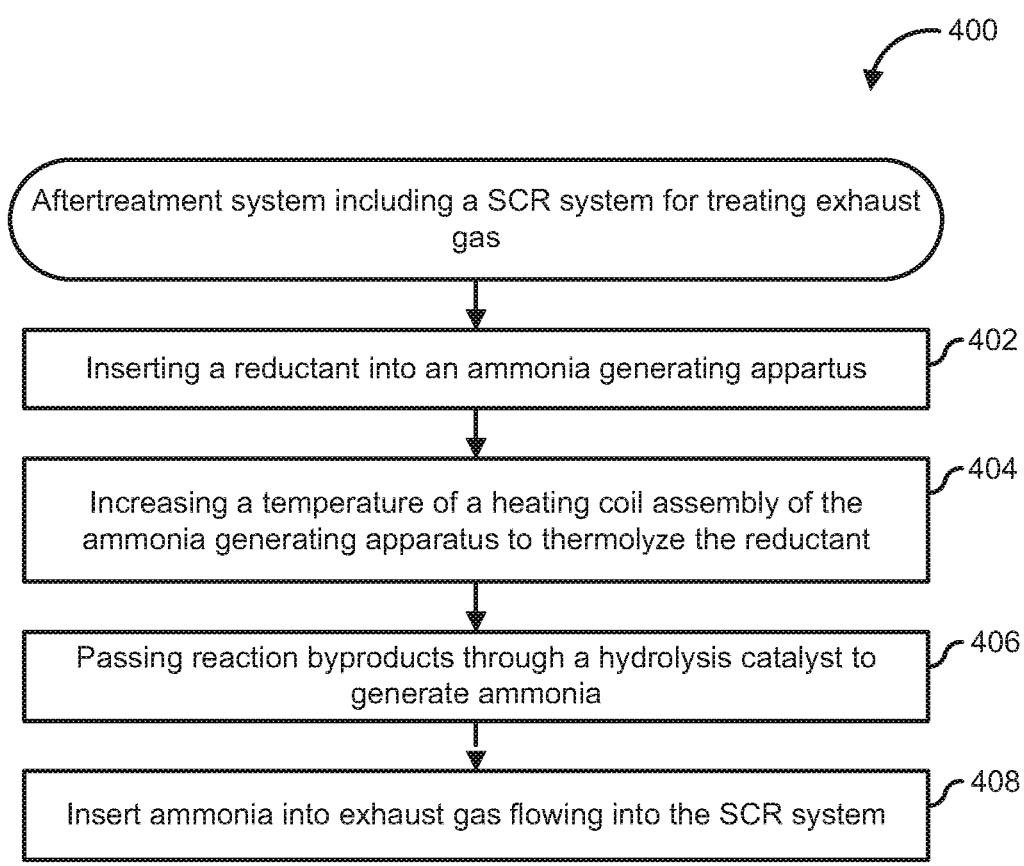
FIG. 10 is a schematic flow diagram of a method for generating ammonia from a liquid reductant, and inserting ammonia into an aftertreatment system, according to an embodiment.

FIG. 9 is a graph showing plots of various urea solutions that were inserted into the ammonia generating apparatus as described herein for generating ammonia at various insertion flow rates, and the corresponding amount of ammonia produced by the ammonia generating apparatus described herein. Insertion of urea solutions having a urea concentrations of 50 wt %, 32.5 wt %, 16.25 wt %, and 8.125 wt % in deionized water at a flow rate of up to 400 g/hour was performed without observing any deposits in the ammonia generating apparatus or downstream thereof.

While various embodiments of the ammonia generating apparatus are described with respect to ammonia being used in the aftertreatment system 100, in other embodiments, the ammonia produced by the ammonia generating apparatus 130, 230, 330 may be used for generating hydrogen for use as a fuel, in a fuel cell to produce electrical power (e.g., in fuel cell vehicles or hybrid power train applications). For example, an ammonia cracking catalyst may be disposed downstream of the ammonia generating apparatus 130, 230, 330, which is formulated to catalyze decomposition of the ammonia into hydrogen and nitrogen by cracking. The generated hydrogen may then be used as a fuel, for example, in a fuel cell. A major benefit of this application is that reductant (e.g., a urea solution) is much safer to carry than ammonia or hydrogen. Also, the use of hydrogen as a fuel promotes clean energy since the hydrogen is produced from a short-carbon-chain molecule ($CON_2H_4$), reducing the carbon footprint of the overall vehicle operation.

Referring again to FIG. 1, the controller 170 may be operatively coupled to the first sensor 103, the second sensor 105, the heating coil assembly 134, the heaters 136, the reductant insertion assembly 112, the gas insertion assembly 114, and the reductant injector 120. The controller 170 may be operatively coupled to the components of the aftertreatment system 100 using any type and any number of wired or wireless connections. For example, a wired connection may include a serial cable, a fiber optic cable, a CATS cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

In some embodiments, the controller 170 may be configured to receive a first sensor signal from the first sensor 103 and/or the second sensor 105 and determine an operational parameter of the exhaust gas therefrom. The operational parameter may include an amount of NOx gases in the exhaust gas, an exhaust gas flow rate, an exhaust gas temperature, etc.

The controller 170 is operatively coupled to the heating coil assembly 134 and configured to selectively provide electrical power to the heating coil assembly 134 for thermolyzing the reductant, as previously described herein. For example, the controller 170 may be configured to energize the heating coil assembly 134 simultaneously while activating the reductant insertion assembly 112 and the reductant injector 120 such that the reductant inserted by the reductant injector 120 into the ammonia generating apparatus 130 is thermolyzed into ammonia.

In some embodiments, the controller 170 may be configured to control an amount of electrical energy (e.g., current or voltage) provided to the heating coil assembly so as to maintain a temperature of the heating coil assembly 134 within a temperature range, for example, in a range of about 130 degrees Celsius to about 500 degrees Celsius (e.g., about 130, 135, 140, 145, 150, 155, 160, 165, 170, 175, 180, 185, 190, 195, 200 250, 300, 350, 400, 450, or 500 degrees Celsius, inclusive). In such embodiments, a temperature sensor may be associated with the ammonia generating apparatus 130 or any other ammonia generating apparatus described herein to determine a temperature of the heating coil assembly 134. The temperature sensor may be in a closed loop with the controller 170, and the controller 170 may adjust an electrical power level and/or duty cycle of electrical power provided to the heating coil assembly 134 based on a temperature signal received from the temperature sensor to maintain the temperature of the heating coil to be within the temperature range.

Thus, the controller 170 provides flexibility in heating of the reductant for space claim variability, power consumption variability, and decomposition requirement variability that may change depending on a particular application (e.g., engine operating with exhaust gas recirculation or no exhaust gas recirculation), and use of the ammonia generating apparatus 130 (e.g., partial duty or full duty). Electric heating carries a fuel consumption and thus a $CO_2$ penalty, so the controller 170 may be configured to vary amount of electrical power provided to the heating coil assembly 134 depending on engine fuel efficiency needs, and amount of $CO_2$ that can be safely emitted into the environment (e.g., based on system parameters or regulation).

In some embodiments in which the aftertreatment system 100 includes the gas insertion assembly 114, the controller 170 may be further configured to determine whether a demand for reductant is present based on at least one operating parameter of an exhaust gas flowing through the aftertreatment system 100. If a demand for the reductant is present (e.g., based on an amount of NOx gases present in the exhaust gas, the flow rate and/or temperature of the exhaust gas) the controller 170 may activate the reductant insertion assembly 112, the gas insertion assembly 114 and the reductant injector 120 to provide gas assisted insertion of the reductant into the ammonia generating apparatus 130. The controller 170 also energizes the heating coil assembly 134 (i.e., provides electric current thereto) to thermolyze the reductant, and may also energize the heater 136 to maintain a uniform temperature within the internal volume of the housing 132.

Responsive to a demand for the reductant not being present (e.g., once the engine 10 is turned OFF), the controller 170 may command the reductant insertion assembly 112 to stop insertion of the reductant into the reductant injector 120. The controller 170 may command the gas insertion assembly 114 to continue inserting air into the reductant injector 120 for a first time (e.g., 1 second 5, second, 10 second, 15 second or 20 second, inclusive) after commanding the reductant insertion assembly 112 to stop reductant insertion so as to flush reductant out of the reductant injector 120. This prevents the reductant from crystallizing and forming reductant deposits in the reductant injector 120. It should be appreciated that while the above example describes the reductant injector 120 as being configured for gas assisted reductant insertion, reductant injectors configured for gas-less reductant insertion can be used with the ammonia generating apparatus 130 or any other ammonia generating apparatus described herein, while providing similar benefits.

In some embodiments, the controller 170 may also be configured to command the hydrocarbon insertion assembly 116 to selectively insert hydrocarbons into the aftertreatment system 100. For example, in response to determining that a catalytic conversion efficiency of the SCR system 150 has dropped below a threshold value, the controller 170 may be configured to command the hydrocarbon insertion assembly 116 to insert hydrocarbons into the aftertreatment system 100 for regenerating the SCR system 150.

Figure 2:
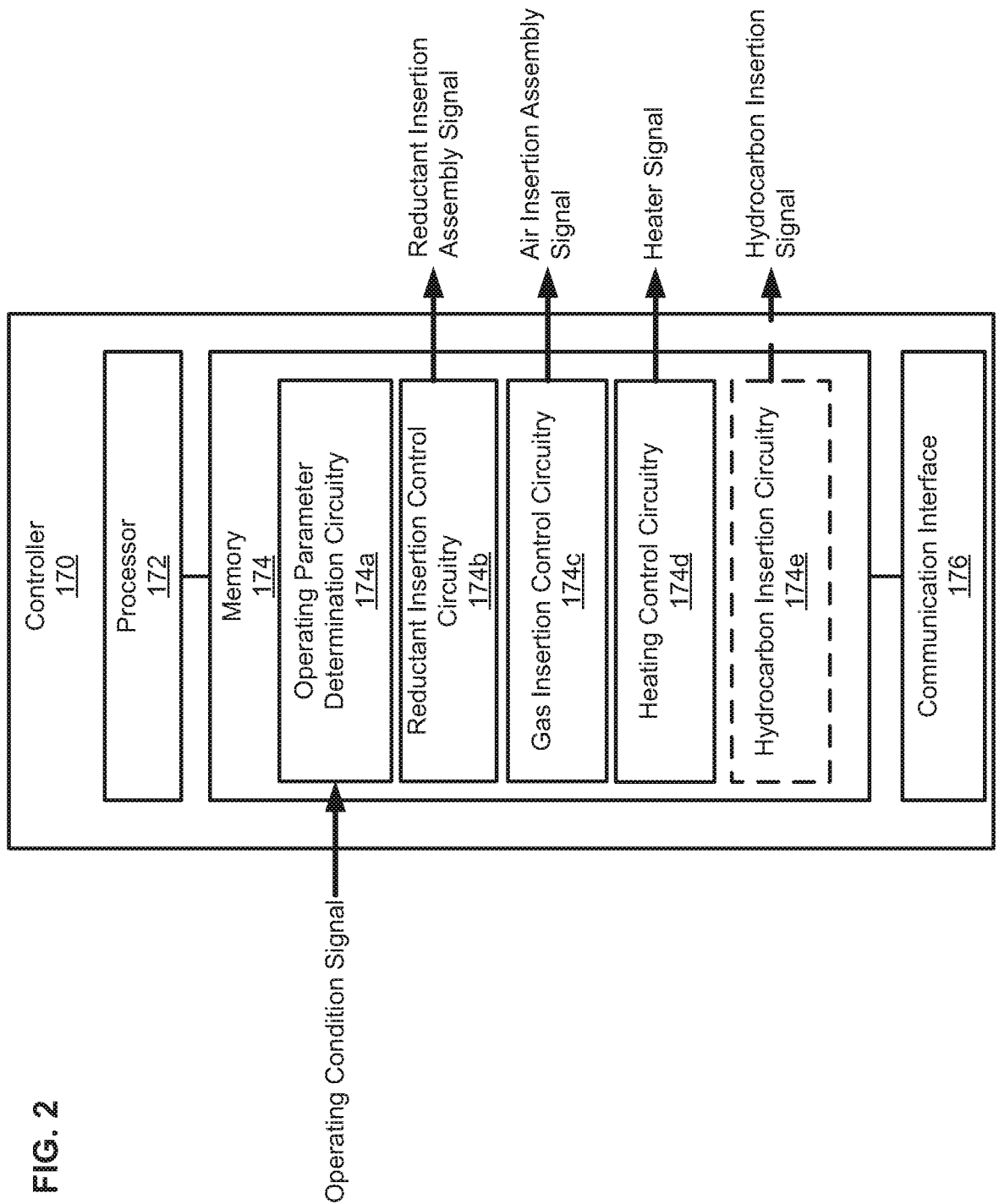
FIG. 2 is schematic block diagram of a controller that may be used with the aftertreatment system of FIG. 1, according to an embodiment.

In particular embodiments, the controller 170 may include one or more components configured to perform the operations of the controller 170 as described herein. For example, FIG. 2 is a schematic block diagram of the controller 170, according to an embodiment. The controller 170 comprises a processor 172, a memory 174, or any other computer readable medium, and a communication interface 176. Furthermore, the controller 170 includes an operating parameter determination circuitry 174a, a reductant insertion control circuitry 174b, a gas insertion control circuitry 174c, a heating control circuitry 174d, and in some embodiments, a hydrocarbon insertion control circuitry 174e. It should be understood that the controller 170 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the operating parameter determination circuitry 174a, the reductant insertion control circuitry 174b, the gas insertion control circuitry 174c, the heating control circuitry 174d, and the hydrocarbon insertion control circuitry 174e are embodied as machine or computer-readable media (e.g., stored in the memory 174) that is executable by a processor, such as the processor 172. As described herein and amongst other uses, the machine-readable media (e.g., the memory 174) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the operating parameter determination circuitry 174a, the reductant insertion control circuitry 174b, the gas insertion control circuitry 174c, the heating control circuitry 174d, and the hydrocarbon insertion control circuitry 174e are embodied as hardware units, such as electronic control units. As such, the operating parameter determination circuitry 174a, the reductant insertion control circuitry 174b, the gas insertion control circuitry 174c, the heating control circuitry 174d, and the hydrocarbon insertion control circuitry 174e may be embodied as one or more circuitry components including, but not limited to, processing circuitry, network interfaces, peripheral devices, input devices, output devices, sensors, etc.

In some embodiments, the operating parameter determination circuitry 174a, the reductant insertion control circuitry 174b, the gas insertion control circuitry 174c, the heating control circuitry 174d, and the hydrocarbon insertion control circuitry 174e may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the operating parameter determination circuitry 174a, the reductant insertion control circuitry 174b, the gas insertion control circuitry 174c, the heating control circuitry 174d, and the hydrocarbon insertion control circuitry 174e may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the operating parameter determination circuitry 174a, the reductant insertion control circuitry 174b, the gas insertion control circuitry 174c, the heating control circuitry 174d, and the hydrocarbon insertion control circuitry 174e may also include programmable hardware devices such as field programmable gate arrays, programmable array logic, programmable logic devices or the like. In this regard, the operating parameter determination circuitry 174a, the reductant insertion control circuitry 174b, the gas insertion control circuitry 174c, the heating control circuitry 174d, and the hydrocarbon insertion control circuitry 174e may include one or more memory devices for storing instructions that are executable by the processor(s) of the operating parameter determination circuitry 174a, the reductant insertion control circuitry 174b, the gas insertion control circuitry 174c, the heating control circuitry 174d, and the hydrocarbon insertion control circuitry 174e. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect the operating parameter determination circuitry 174a, the reductant insertion control circuitry 174b, the gas insertion control circuitry 174c, the heating control circuitry 174d, and the hydrocarbon insertion control circuitry 174e. Thus, the depicted configuration represents the aforementioned arrangement where the operating parameter determination circuitry 174a, the reductant insertion control circuitry 174b, the gas insertion control circuitry 174c, the heating control circuitry 174d, and the hydrocarbon insertion control circuitry 174e are embodied as machine or computer-readable media. However, as mentioned above, this illustration is not meant to be limiting as the present disclosure contemplates other embodiments such as the aforementioned embodiment where the operating parameter determination circuitry 174a, the reductant insertion control circuitry 174b, the gas insertion control circuitry 174c, the heating control circuitry 174d, and the hydrocarbon insertion control circuitry 174e, or at least one circuit of the operating parameter determination circuitry 174a, the reductant insertion control circuitry 174b, the gas insertion control circuitry 174c, the heating control circuitry 174d, and the hydrocarbon insertion control circuitry 174e are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the operating parameter determination circuitry 174a, the reductant insertion control circuitry 174b, the gas insertion control circuitry 174c, the heating control circuitry 174d, and the hydrocarbon insertion control circuitry 174e) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicatively connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with, for example, the first sensor 103, the second sensor 105, the engine 10, the reductant insertion assembly 112, the gas insertion assembly 114, the hydrocarbon insertion assembly 116, the reductant injector 120, the ammonia generating apparatus 130, and/or any other component of the aftertreatment system 100. The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The operating parameter determination circuitry 174a may be configured to receive an operating condition signal (e.g., from the engine 10, the first sensor 103, the second sensor 105 or any other sensors included in the aftertreatment system 100) and determine an operating condition of the exhaust gas therefrom (e.g., an exhaust gas temperature, pressure, flow rate and/or amount of NOx gases included in the exhaust gas).

The reductant insertion control circuitry 174b is configured to use the operating condition of the exhaust gas to generate a reductant insertion assembly signal configured to activate the reductant insertion assembly 112 (e.g., turn ON a pump of the reductant insertion assembly 112) and/or open a dosing valve of the reductant insertion assembly 112, for example, to cause a reductant to flow from the reductant insertion assembly 112 to the reductant injector 120.

For example, the reductant insertion control circuitry 174b may be configured to activate the reductant insertion assembly 112 in response to the engine 10 turning ON, which corresponds to commencement of flow of the exhaust gas through the aftertreatment system 100, and/or the exhaust gas temperature, pressure, flow rate, and/or amount of NOx gases included in the exhaust gas being equal to or greater than a predetermined threshold. In other embodiments, the reductant insertion control circuitry 174b may be configured to activate the reductant insertion assembly 112 in response to a volume of ammonia stored in the catalyst 154 of the SCR system 150 being less than a predetermined threshold.

Similarly, the reductant insertion control circuitry 174b may be configured to deactivate the reductant insertion assembly 112 (e.g., turn OFF a pump or close the dosing valve of the reductant insertion assembly 112) in response to a different operating condition signal (e.g., corresponding to the engine 10 turning OFF, temperature, pressure, flow rate and/or amount of NOx gases included in the exhaust gas being less than the predetermined threshold, and/or the amount of ammonia stored in the SCR system 150 being equal to or greater than the predetermined threshold). The reductant insertion control circuitry 174b also be configured to activate the reductant injector 120 to selectively insert reductant into the ammonia generating apparatus 130.

The gas insertion control circuitry 174c may be configured to selectively activate the gas insertion assembly 114 for selectively inserting the gas (e.g., air or exhaust gas) into the reductant injector 120 so as to provide gas assisted delivery of the reductant into the ammonia generating apparatus 130.

The heating control circuitry 174d is configured to selectively activate the heating coil assembly 134 for converting the reductant inserted into the ammonia generating apparatus 130 into ammonia, as previously described herein. For example, the heating control circuitry 174d may be configured to control an electrical power or a duty cycle of the electric signal provided to the heating coil assembly 134 so as to control an electrical power level or a duty cycle of the electrical power provided to the heating coil assembly 134 to heat the heating coil assembly 134 to a desired temperature and maintain it thereat. The heating control circuitry 174d may also be configured to control an amount of electrical power provided to the heater 136. The heater 136 may be configure to heat the housing 132 of the ammonia generating apparatus so as to maintain a temperature of the internal volume defined by the housing 132.

The hydrocarbon insertion control circuitry 174e is configured to activate the hydrocarbon insertion control circuitry 174e to cause the hydrocarbon insertion control circuitry 174e to selectively insert hydrocarbons into the aftertreatment system 100. For example, the hydrocarbon insertion control circuitry 174e may be configured to determine a catalytic conversion efficiency of the SCR system 150 and in response to the catalytic conversion efficiency dropping below a threshold, command the hydrocarbon insertion control circuitry 174e to insert hydrocarbons into the aftertreatment system 100 for regenerating the SCR system 150, as previously described herein.

Figure 11:
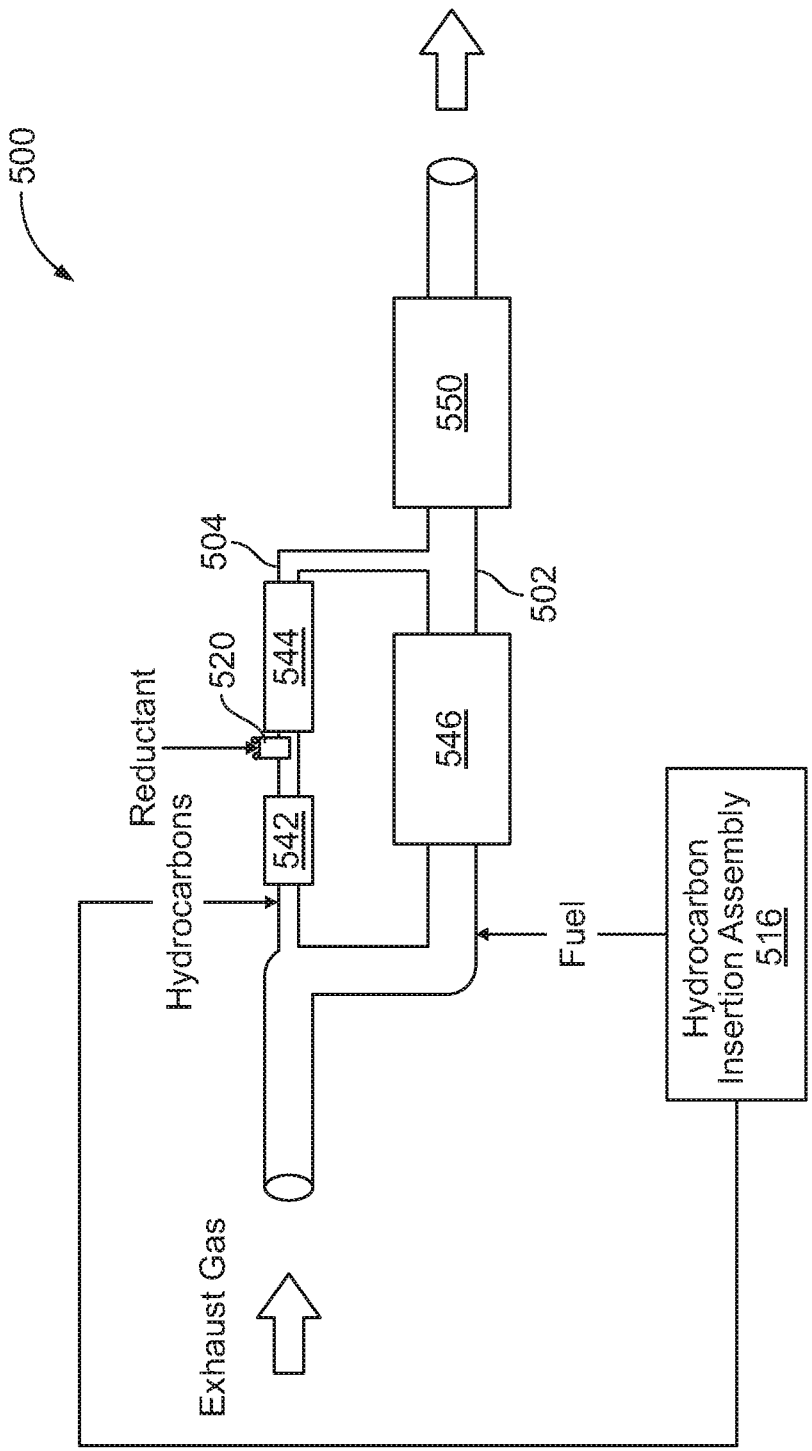
FIG. 11 is a schematic block diagram of an aftertreatment system, according to another embodiment.

FIG. 11 is a schematic flow diagram of an example method 400 for generating ammonia from a reductant, according to an embodiment. The ammonia may be inserted into an aftertreatment system 100 including the SCR system 150. While described with respect to the aftertreatment system 100, it should be understood that the operations of the method 400 may be used with any other aftertreatment system.

The method 400 includes inserting a reductant into an ammonia generating apparatus, at 402. For example, the controller 170 may instruct the reductant insertion assembly 112 and the gas insertion assembly 114 to insert reductant and gas into the reductant injector 120, and selectively activate the reductant injector 120 to insert reductant into the ammonia generating apparatus 130.

At 404, a temperature of a heating coil assembly of the ammonia generating apparatus is increased to a temperature sufficient to thermolyze the reductant and generate ammonia and reaction by products. For example, the controller 170 may be configured to provide electric current to the heating coil assembly 134 to increase a temperature of the heating coil assembly 134 to a temperature that is sufficient to thermolyze the reductant inserted into the aftertreatment system 100.

At 406, the reaction byproducts of the thermolysis reaction are passed through a hydrolysis catalyst to generate ammonia from the reaction byproducts. For example, the reaction byproducts (e.g., iso-cyanic acid) of the thermolysis reaction are inserted into the hydrolysis catalyst 140 to convert the reaction byproducts into ammonia. At 408, the ammonia is inserted into the aftertreatment system (e.g., the aftertreatment system 100).

While the previously mentioned embodiments describe thermolysis of a reductant using an ammonia generating apparatus, in other embodiments, aftertreatment systems may be configured to perform thermolysis of the reductant by increasing a temperature of an exhaust gas flowing therethrough. For example, FIG. 11 is a schematic illustration of an aftertreatment system 500, according to another embodiment. The aftertreatment system 500 includes an exhaust conduit 502 configured to receive an exhaust gas. An SCR system 550 is disposed in the exhaust conduit 502 and configured to decompose constituents of the exhaust gas.

A bypass conduit 504 is fluidly coupled to the exhaust conduit 502. The bypass conduit 504 is configured to receive a portion of the exhaust gas flowing through the exhaust conduit 502 from an upstream location of the exhaust conduit 502 and return the portion of the exhaust gas to the exhaust conduit 502 at a downstream location of the exhaust conduit 502. A first oxidation catalyst 542 is disposed in the bypass conduit 504. A hydrolysis catalyst 546' (e.g., the hydrolysis catalyst 140) is disposed in the bypass conduit 504 downstream of the first oxidation catalyst 542. A reductant injector 520 is coupled to the bypass conduit 504 at a location between the first oxidation catalyst 542 and the hydrolysis catalyst 546 and configured to insert a reductant into the exhaust conduit 502 between the first oxidation catalyst 542 and the hydrolysis catalyst 546.

The aftertreatment system 500 also includes a hydrocarbon insertion assembly 516 configured to selectively insert hydrocarbons into the first oxidation catalyst 542 causing the hydrocarbons to combust and increase a temperature of the exhaust gas to a first temperature sufficient to thermolyze the reductant and generate ammonia and reaction byproduct. The reaction byproducts and ammonia flow through the hydrolysis catalyst 546 that then converts the reaction byproducts into ammonia. The ammonia is then communicated to the exhaust conduit 502 by the bypass conduit 504 and is used by the SCR system 150 to decompose NOx gases included in the exhaust gas.

In some embodiments, the aftertreatment system 500 may also include a second oxidation catalyst 546 (e.g., a diesel oxidation catalyst) disposed in the exhaust conduit 502 upstream of the SCR system 550. In such embodiments, the upstream location of the exhaust conduit 502 where an inlet of the bypass conduit 504 is coupled to the exhaust conduit 502 is upstream of the second oxidation catalyst 546. A downstream location of the exhaust conduit 502 where an outlet of the bypass conduit 504 is coupled to the exhaust conduit 502 is between the second oxidation catalyst 546 and the SCR system 550.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As used herein, the term "about" generally mean plus or minus 10% of the stated value. For example, about 0.5 would include 0.45 and 0.55, about 10 would include 9 to 11, about 1000 would include 900 to 1100.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An ammonia generating apparatus comprising:
   a housing comprising a first end wall on which a reductant injector configured to insert a reductant into the housing is mountable; and
   a heating coil assembly disposed within the housing, the heating coil assembly comprising:
   a first heating coil having a first heating coil first end located proximate to the reductant injector and a first heating coil second end opposite the first heating coil first end, the first heating coil having a first cross-sectional width, and
   a second heating coil located proximate to the first heating coil second end of the first heating coil and axially aligned with the first heating coil, the second heating coil having a second cross-sectional width larger than the first cross-sectional width,
   wherein a first end of the heating coil assembly is located proximate to a location of the first end wall where a reductant injector tip of the reductant injector is located when the reductant injector is mounted on the first end wall, and wherein the heating coil assembly is configured to generate heat sufficient to thermolyze the reductant to generate ammonia and reaction byproducts, in response to an electric current being passed therethrough.

2. The ammonia generating apparatus of claim 1, further comprising:
a hydrolysis catalyst disposed downstream of the heating coil assembly, the hydrolysis catalyst formulated to catalyze hydrolysis of the reaction byproducts into ammonia.

3. The ammonia generating apparatus of claim 1, wherein:
a first heating coil first end of the first heating coil that is located proximate to the reductant injector is flared.

4. The ammonia generating apparatus of claim 3, further comprising:
a reductant injector mount disposed in the first end wall of the housing, in which the reductant injector is mountable.

5. The ammonia generating apparatus of claim 4, wherein:
the reductant injector mount comprises a cone shaped baffle extending from the reductant injector mount towards the first heating coil.

6. The ammonia generating apparatus of claim 5, wherein:
an end of the baffle that is distant from the reductant injector extends into the flared first heating coil first end.

7. The ammonia generating apparatus of claim 1, further comprising:
a heater disposed on an outer surface of the housing and configured to selectively heat the housing.

8. A reductant insertion system for inserting a reductant into an aftertreatment system, comprising:
a reductant insertion assembly;
a reductant injector disposed downstream of the reductant insertion assembly; and
an ammonia generating apparatus configured to be fluidly coupled to an exhaust conduit of an aftertreatment system, the ammonia generating apparatus comprising:
a housing comprising a first end wall on which the reductant injector is mounted,
wherein the reductant injector is configured to insert a reductant into the housing, and a heating coil assembly disposed within the housing, the heating coil assembly comprising:
a first heating coil having a first heating coil first end located proximate to the reductant injector and a first heating coil second end opposite the first heating coil first end, the first heating coil having a first cross-sectional width, and
a second heating coil located proximate to the first heating coil second end of the first heating coil and axially aligned with the first heating coil, the second heating coil having a second cross-sectional width larger than the first cross-sectional width,
wherein a first end of the heating coil assembly is located proximate to a reductant injector tip of the reductant injector, and
wherein the heating coil assembly is configured to generate heat sufficient to thermolyze the reductant to generate ammonia and reaction byproducts, in response to an electric current being passed therethrough.

9. The reductant insertion system of claim 8, wherein:
the ammonia generating apparatus further comprises a hydrolysis catalyst disposed downstream of the heating coil assembly, the hydrolysis catalyst configured to catalyze hydrolysis of the reaction byproducts into ammonia.

10. The reductant insertion system of claim 8, further comprising:
a controller operatively coupled to the heating coil assembly, the controller configured to selectively communicate the electric current to the heating coil assembly.

11. The reductant insertion system of claim 10, further comprising:
a gas insertion assembly configured to insert air into the reductant injector so as to provide gas assisted delivery of the reductant into the housing, and wherein the controller is also operatively coupled to the reductant insertion assembly and the gas insertion assembly,
wherein the controller is further configured to:
determine whether a demand for reductant is present based on at least one operating parameter of an exhaust gas flowing through the aftertreatment system,
responsive to a demand for the reductant not being present, command the reductant insertion assembly to stop insertion of the reductant into the reductant injector, and
command the gas insertion assembly to continue inserting air into the reductant injector for a first time after commanding the reductant insertion assembly to stop reductant insertion so as to flush reductant out of the reductant injector.

12. The reductant insertion system of claim 8, wherein:
a first heating coil first end of the first heating coil that is located proximate to the reductant injector is flared.

13. The reductant insertion system, of claim 12, further comprising:
a reductant injector mount disposed in the first end wall of the housing, the reductant injector mounted in the reductant injector mount.

14. The reductant insertion system of claim 13, wherein:
the reductant injector mount comprises a cone shaped baffle extending from the reductant injector mount towards the first heating coil.

15. The reductant insertion system of claim 14, wherein:
an end of the baffle distal from the reductant injector extends into the flared heating coil first end.

16. The reductant insertion system of claim 8, further comprising:
a heater disposed on an outer surface of the housing and configured to selectively heat the housing.

17. An aftertreatment system for treating exhaust gas produced by an engine, comprising:
an exhaust conduit configured to receive the exhaust gas;
a selective catalytic reduction system disposed in the exhaust conduit;
a bypass conduit fluidly coupled to the exhaust conduit, the bypass conduit configured to receive a portion of the exhaust gas flowing through the exhaust conduit from an upstream location of the exhaust conduit and return the portion of the exhaust gas to the exhaust conduit at a downstream location of the exhaust conduit;
a first oxidation catalyst disposed in the bypass conduit;
a hydrolysis catalyst disposed in the bypass conduit downstream of the first oxidation catalyst;
a reductant injector coupled to the bypass conduit at a location between the first oxidation catalyst and the hydrolysis catalyst and configured to insert a reductant into the exhaust conduit between the first oxidation catalyst and the hydrolysis catalyst; and
a hydrocarbon insertion assembly configured to selectively insert hydrocarbons into the first oxidation catalyst causing the hydrocarbons to combust so as to increase a temperature of the exhaust gas to a first temperature sufficient to thermolyze the reductant and generate ammonia and reaction byproducts, wherein the hydrolysis catalyst is formulated to catalyze hydrolysis of the reaction byproducts into ammonia.

18. The aftertreatment system of claim 17, further comprising:

a second oxidation catalyst disposed in the exhaust conduit upstream of the selective catalytic reduction system, wherein the upstream location of the exhaust conduit is upstream of the second oxidation catalyst, and the downstream location of the exhaust conduit is between the second oxidation catalyst and the selective catalyst reduction system.

\* \* \* \* \*